United States Patent Office 3,026,350
Patented Mar. 20, 1962

3,026,350
PROCESS FOR PREPARING ACETYLSALICYLIC ACID ANHYDRIDE
Christian Jean-Marie Warolin, 12 Rue Abel Ferry, Paris, France, and Pierre Robert Billot, 11 Rue Pasteur, Bois-Colombes, France
No Drawing. Filed Feb. 10, 1960, Ser. No. 7,757
Claims priority, application France June 22, 1959
6 Claims. (Cl. 260—480)

The present invention relates to the preparation of acetylsalicylic acid anhydride or Aspirin anhydride.

This compound, having no more free acid functions left in the molecule thereof, offers as compared with acetylsalicylic acid the advantage of having a better digestive tolerance experimentally verified on mice, rats and dogs and clinically verified on human beings.

Its toxicity is lower than that of acetylsalicylic acid. Owing to its chemical constitution, acetylsalicylic acid anhydride is tasteless and the preservation characteristics are excellent.

The remarkable tolerance of the symmetrical acetylsalicylic acid anhydride puts it in a leading place amongst the analgesic-antipyretics and the anti-inflammatories.

All these advantageous properties justify the interest attached to the preparation thereof, of which quite a number of methods have already been disclosed.

However, all these methods are rather troublesome, give comparatively poor yields, and lack constancy from one batch to the next.

They imply the use of acetylsalicylic acid chloride and can be divided into two main categories, viz: the methods in which said chloride has been pre-synthesized during a stage preceding the anhydride preparation proper, and those in which the chloride is prepared in the very reaction medium yielding Aspirin anhydride. In the latter case this chloride is therefore not isolated and the Aspirin anhydride preparation is conducted in a single stage.

Whether isolated or non-isolated, the Aspirin chloride has been used in accordance with one of the following methods:

Acylation of a stoichiometric amount of Aspirin by the acid chloride in the presence of pyridine of a tertiary base;

Hydrolysis of the pyridinium salt generated by the Aspirin chloride and pyridine;

Interaction between the Aspirin chloride and aspirin sodium salt in an anhydrous medium.

The last-mentioned method requires the preliminary preparation of the sodium salt of Aspirin, the poor stability of which is well-known. On the other hand, the double decomposition between the Aspirin sodium salt and the Aspirin chloride is carried out in an organic medium, in which the sodium salt is insoluble and in which the Aspirin anhydride is on the contrary soluble. Thus, at the end of the reaction, the solvent has to be distilled, leading to a decrease of the anhydride yield, this molecule being highly sensitive to heat.

Accordingly, the final yield is unsatisfactory and the resulting product is frequently oily and most difficult to crystallize.

Now we have found that the aforesaid difficulties can be overcome in employing a process which is much simpler than the methods practiced heretofore.

The process according to the invention, in which a salt of acetylsalicylic acid is reacted with the chloride of said acid, is essentially characterized in that it comprises preparing this salt in situ from an aqueous suspension of acetylsalicylic acid, and adding to the thus-formed solution, to cause it to be reacted, a solution of acetylsalicylic acid chloride in a water-soluble organic solvent.

Thus, in accordance with the teachings of the invention, the acetylsalicylic acid salt is not isolated, to the contrary of the prior art methods. Moreover, the reaction of this salt with the acid chloride is conducted in a homogeneous medium, this reaction thus being facilitated. It has actually been found that it is possible to operate in an aqueous medium, in which the acetylsalicylic acid chloride is normally instantaneously hydrolyzed, provided that said chloride is added to the aqueous solution of the acid salt in a water-miscible organic solvent.

Thus, it appears that the solvent provides a protection for the acid chloride by liberating it only gradually as it is reacted with the salt. Since each reactant is introduced in a suitable solvent, it becomes possible to operate in a concentrated medium, both solvents being moreover miscible and enabling a homogeneous medium to be achieved. Lastly, a further advantage resulting from the aforesaid method is due to the fact that upon being formed, the acetylsalicylic acid anhydride is selectively precipitated from this medium, thus being readily separable therefrom.

The various steps of the process will be now subjected to a more detailed study. Any water soluble salt of the acetylsalicylic acid can be formed in situ, e.g. alkali metal salts or the magnesium salt. This salt is formed by adding to the aqueous suspension of the acid a compound capable of freeing the required metal cation. The preferred compounds are metal carbonates and bicarbonates which have the advantage of not introducing into the medium fixed anions.

The solvent for the acetylsalicylic acid chloride must be, as has already been stated, a water-soluble solvent. Amongst solvents suitable for the purpose, there may be mentioned dioxane and acetone.

The acid chloride solution is added with violent stirring to the aqueous solution of the acid salt, at a low temperature, preferably of about +4° C.

The acetylsalicylic acid anhydride is precipitated from the reaction medium as a white solidified mass, which merely needs being filtered. This anyhdride is slightly soiled with acid resulting from the acid chloride partial hydrolysis. To free the anhydride therefrom, it is sufficient to wash it with an aqueous solution of alkali metal or magnesium carbonate or bicarbonate. By acidifying the wash water, it is possible to separate Aspirin therefrom, while an additional amount of acetylsalicylic acid can be recovered from the filtrate obtained in the course of anhydride separation.

The total yield of the process is of the order of 75%, the whole of the acetylsalicylic acid used or formed in the process during the reaction step being moreover recoverable.

The invention is further illustrated by the following example:

360 g. Aspirin are dissolved in 1,500 cc. of water containing 168 g. sodium bicarbonate. 400 g. Aspirin chloride in solution in dioxane (600 cc. of a solution containing 0.666 g. of acid chloride per cc.) are gradually added at a temperature of 4–5° C. with violent stirring.

The solidified mass which has thus been separated is filtered and carefully washed with a 5% solution of sodium bicarbonate. By acidifying the wash solution, the unreacted Aspirin and the Aspirin formed by hydrolysis in the course of the reaction are recovered.

The raw Aspirin anhydride thus obtained is then thoroughly washed with a large amount of water and then dried at a low temperature.

It is recrystallized in a solvent which may be for example, ethyl alcohol or trichloroethylene.

The raw product yield is of the order of 75%.

It is to be understood, that the present invention is

Having now described our invention what we claim as new and desire to secure by Letters Patent is:

1. A process of preparing acetylsalicylic acid anhydride, comprising adding to an aqueous suspension of acetylsalicylic acid a water-soluble derivative of a metal selected from the group consisting of alkali metals and magnesium capable of reacting with acetylsalicylic acid to convert said acid to a water-soluble salt, adding at a temperature of about +4° C. to the thus-formed solution a solution of acetylsalicylic acid chloride in a water-soluble organic solvent violently agitating the mixture thus obtained, and recovering the acetylsalicylic acid anhydride which is precipitated from the reaction medium.

2. A process as defined in claim 1, in which said metal derivative is a carbonate.

3. A process as defined in claim 1, in which said metal derivative is a bicarbonate.

4. A process as defined in claim 1, in which said precipitated anhydride is freed from the soiling acid remaining thereon by washing it with an aqueous solution of an alkali metal derivative selected from the group consisting of carbonates and bicarbonates.

5. A process as defined in claim 1, in which the reaction medium separated from the precipitated anhydride and the wash liquors of said anhydride are acidified to recover the unreacted acetylsalicylic acid and the acetylsalicylic acid formed in the course of the reaction by hydrolysis of the chloride.

6. In a process of preparing acetylsalicylic acid anhydride by reacting a salt of acetylsalicylic acid with the chloride of said acid, the steps comprising adding at a temperature of about +4° C. a solution of acetylsalicylic acid chloride in a water-soluble organic solvent to an aqueous solution of a salt of acetylsalicylic acid selected from the group consisting of the alkali metals and magnesium salts, and violently agitating the mixture to cause said reaction to be effected.

References Cited in the file of this patent

UNITED STATES PATENTS 922,766    Hofmann _____ May 25, 1909